United States Patent
Chernyshev et al.

(10) Patent No.: US 8,091,004 B2
(45) Date of Patent: Jan. 3, 2012

(54) INTER-PACKET SELECTIVE SYMBOL MAPPING IN A JOINT INCREMENTAL REDUNDANCY AND SYMBOL MAPPING DIVERSITY SYSTEM

(75) Inventors: Vladislav A Chernyshev, St. Petersburg (RU); Andrey Efimov, Saint-Petersburg (RU); Mikhail Lyakh, Saint-Petersburg (RU)

(73) Assignee: Intel Corporation, Santa Clara, CA (US)

( * ) Notice: Subject to any disclaimer, the term of this patent is extended or adjusted under 35 U.S.C. 154(b) by 933 days.

(21) Appl. No.: 12/102,584

(22) Filed: Apr. 14, 2008

(65) Prior Publication Data

US 2009/0259907 A1   Oct. 15, 2009

(51) Int. Cl.
   *G06F 11/00* (2006.01)
(52) U.S. Cl. ...................................................... 714/748
(58) Field of Classification Search .................... 714/748
   See application file for complete search history.

(56) References Cited

U.S. PATENT DOCUMENTS

| | | | |
|---|---|---|---|
| 5,396,518 A * | 3/1995 | How | 375/265 |
| 7,370,265 B2 * | 5/2008 | Shen et al. | 714/792 |
| 2004/0085231 A1 * | 5/2004 | Bretl et al. | 341/50 |
| 2007/0162818 A1 * | 7/2007 | Shen et al. | 714/755 |

OTHER PUBLICATIONS

Harvind Samra, Zhi Ding, Peter M Hahn, Symbol Mapping Diversity Design for Multiple Packet Transmissions, IEEE Transactions on Communications, May 2005, vol. 53, No. 5.

* cited by examiner

*Primary Examiner* — Bryce Bonzo
(74) *Attorney, Agent, or Firm* — Schwabe, Williamson & Wyatt, P.C.

(57) ABSTRACT

An integrated incremental redundancy symbol mapping diversity system for a communication device. The integrated incremental redundancy symbol mapping diversity system includes a transmitter. The transmitter packetizes a retransmission packet according to a modulation scheme in response to a retransmission request from the receiver. The transmitter includes an output packet processor and an inter-packet selective symbol mapper. The output packet processor determines a transmission iteration of a bit segment of the retransmission packet. The inter-packet selective symbol mapper applies a first symbol map pattern to the bit segment based on the transmission iteration of the bit segment and applies a second symbol map pattern to another bit segment of the retransmission packet based on the transmission iteration of the other bit segment. The first symbol map pattern is different from the second symbol map pattern.

15 Claims, 4 Drawing Sheets

INTER-PACKET SELECTIVE SYMBOL MAPPING IN A JOINT INCREMENTAL REDUNDANCY AND SYMBOL MAPPING DIVERSITY SYSTEM

BACKGROUND OF THE INVENTION

Modern wireless data transmission systems such as WiMax, WiMax-II, and 3GPP LTE are designed to reduce wireless channel distortions, such as fading, that may cause errors to appear in data even at low noise levels. Common methods of reducing errors include forward error correction (FEC) and hybrid automatic repeat request (HARQ). HARQ is usually implemented in one of two schemes.

The first HARQ scheme implements a simple data retransmission. During the retransmission, the same bits are re-sent and the receiver side combines two or more received packets during demodulation. A common implementation of the simple data retransmission is Chase-combining, or CC-mode.

The other HARQ scheme implements an Incremental Redundancy (IR) scheme, or IR-mode. This scheme utilizes specific features of the error correcting code. It allows decoding having only part of the data word that is transmitted during the first attempt. If decoding fails, the transmit side transmits additional parts of the data word, and the decoder on the receiver side attempts to decode using a combination of the first and subsequent retransmissions to recover from errors. In general, an incremental redundancy method shows improved performance over simple Chase-combining, with the added cost of some additional system complexity.

Customary to bit-to-symbol mappings implemented in HARQ-allowed systems, the same bit-to-symbol mapping is used for each retransmission attempt. Symbol Mapping Diversity (SMD) proposes a slight modification to the bit-to-symbol mapping applied to an entire packet for each subsequent retransmission. If there is any uncertainty in the results at the receiver side, then, in the retransmission, a new mapping is applied to the entire retransmission packet in an attempt to reduce the number of retransmissions. In WiMAX, the IR packet during any retransmission may hold both bits that are going to be transmitted for the first time, as well as some bits that have already been transmitted in a previously transmitted packet. Thus, selecting an entire retransmission packet and applying an SMD mapping to the entire retransmission packet based on the number of retransmissions leads to a correct mapping for only some of the bits in the IR packet, showing no performance increase.

BRIEF DESCRIPTION OF THE DRAWINGS

Throughout the description, similar reference numbers may be used to identify similar elements.

DETAILED DESCRIPTION

Figure 1:
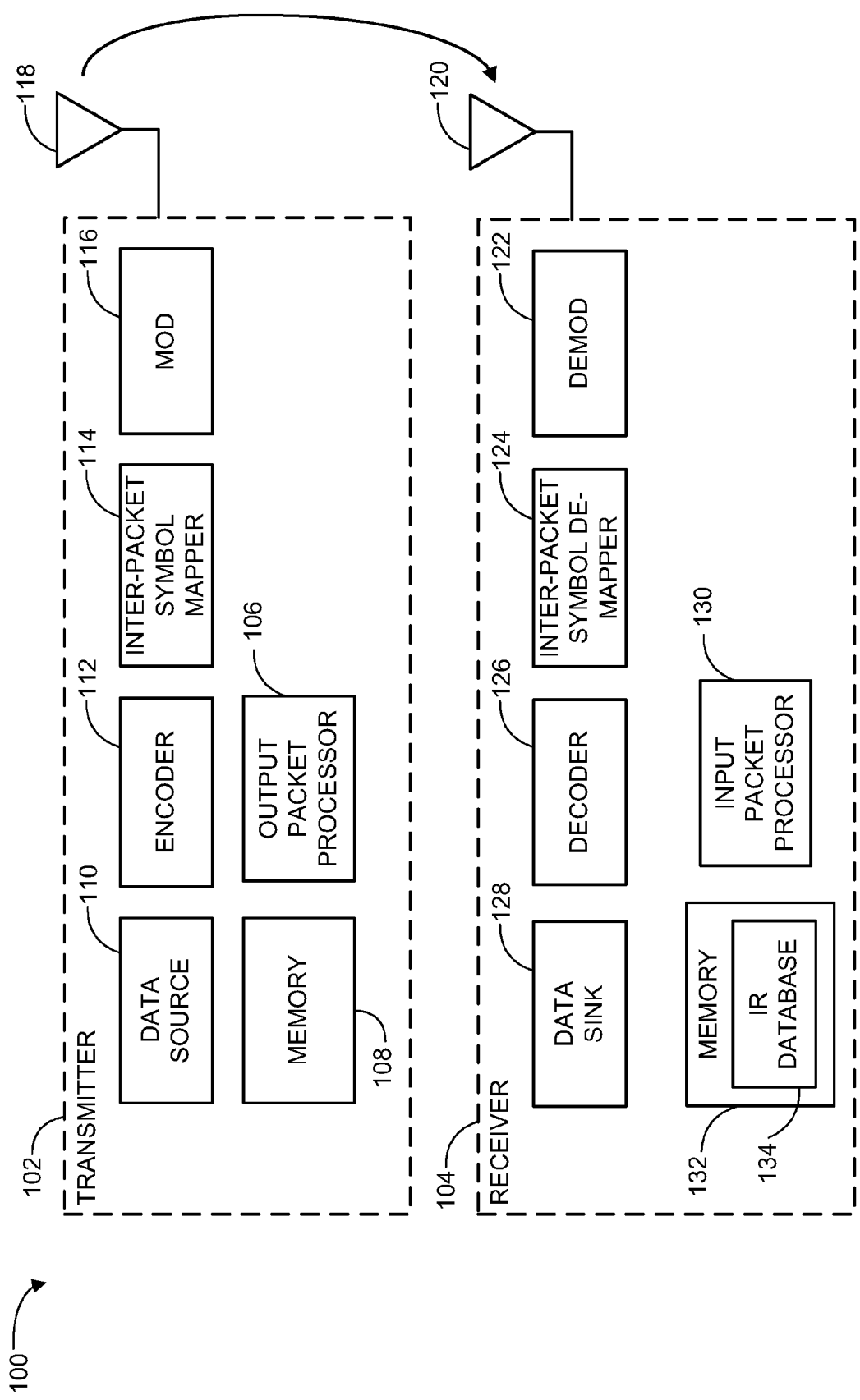
FIG. 1 depicts a schematic block diagram of one embodiment of an inter-packet selective symbol mapping diversity system.

FIG. 1 depicts a schematic block diagram of one embodiment of an inter-packet selective symbol mapping diversity system 100. The inter-packet selective symbol mapping diversity system 100 includes a transmitter 102 and a receiver 104. Although certain component parts are shown in conjunction with the inter-packet selective symbol mapping diversity system 100 of FIG. 1, other embodiments may include fewer or more component parts, or equivalent parts, to perform fewer or more incremental redundancy and symbol mapping diversity functions. Additionally, while the components of the inter-packet selective symbol mapping diversity system 100 are shown in FIG. 1 as being separate components, some of these components may be integrated. As an example, the components of the transmitter 102 and/or the components of the receiver 104 may be implemented in a single integrated circuit chip. Furthermore, some of the components of the inter-packet selective symbol mapping diversity system 100, such as the encoder 112 and the inter-packet selective symbol mapper 114 may be implemented in combination of software, hardware, and/or firmware.

As depicted in FIG. 1, the transmitter 102 includes an output packet processor 106, a transmitter memory device 108, a data source 110, an encoder 112, an inter-packet selective symbol mapper 114, at least one modulator 116, and at least one transmitter antenna 118. In general, the transmitter transmits data to a receiver. In some instances, the receiver is unable to correctly decode the transmitted data. In this scenario, the receiver may send a retransmission request to the transmitter. The transmitter 102 receives the retransmission request from the receiver 104 and, in one embodiment, packetizes a retransmission packet in response to a receipt of the retransmission request from the receiver 104. In one embodiment, the retransmission request is a hybrid automatic repeat request (HARQ) and the retransmission packet is an incremental redundancy (IR) packet. The data source 110 supplies a portion of data to include in the packetized retransmission packet. In one embodiment, the data source 110 supplies portions of data that contain bits that have not yet been transmitted and supplies other portions of data that contain bits that have been transmitted at least once in previous transmission packets. Thus, the data source 110 supplies portions of data with bit segments of mixed transmission iterations.

The output packet processor 106, in one embodiment, determines the transmission iteration of a bit segment, which is supplied by the data source 110 and included in the retransmission packet. The transmission iteration indicates a number of transmissions of the bit segment. In other words, if the retransmission packet contains bits with N transmission iterations, then the retransmission packet contains N bit segments where each group correlates on a one-to-one basis respectively with one of the N transmission iterations of a given bit segment.

In one embodiment, each bit segment is physically grouped together such that the order of the bits in the retransmission packet are grouped and ordered according to the transmission iteration of each bit segment. Alternatively, the output packet processor 106 tracks the transmission iteration of each bit, regardless of the physical location of each bit in the retransmission packet.

In one embodiment, the encoder 112 encodes each bit segment contained in the retransmission packet based on the transmission iteration of each bit segment. In some embodiments, the encoder 112 implements a convolutional code to encode the retransmission packet. A convolutional code is a forward error-correction (FEC) scheme, in which the coded sequence is algorithmically achieved through the use of presently encoded data bits combined with previous encoded data bits from the same portion of data supplied by the data source 110. In some embodiments, the encoder 112 interleaves the bits contained in the data that is supplied by the data source 110. Interleaving is a method to protect the transmission against errors by arranging the bits in a non-contiguous order. In order to achieve a desired code rate, in one embodiment, the encoder 112 implements a punctured convolutional code with a plurality of puncturing patterns. Puncturing is a process applied to convolutional coding. Puncturing omits a select number of bits from the encoded data generated by convolutional coding. Puncturing the convolutional code decreases the number of bits in a given output data stream resulting in a lower bit rate than the given data stream would have without puncturing the convolutionally encoded data. In one embodiment, the encoder 112 implements a punctured turbo code with a ⅓ code rate. A turbo code is an encoding scheme that combines two or more relatively short convolutional codes with an interleaver in order to transmit block codes in noisy channels with a transmission rate within a fraction of a decibel of the Shannon limit. The Shannon limit and the method of punctured convolutional coding are well known in the art and are not discussed further.

The inter-packet selective symbol mapper 114, in one embodiment, applies a first symbol map pattern to a bit segment based on the transmission iteration of the bit segment. The inter-packet selective symbol mapper 114 applies a second symbol map pattern to another bit segment of the retransmission packet based on the transmission iteration of the other bit segment. In one embodiment, the inter-packet selective symbol mapper 114 configures a symbol map pattern for at least two different bit segments in the retransmission packet that differ in transmission iterations. In another embodiment, a symbol map pattern correlates to a single bit segment in the retransmission packet. For example, an exemplary symbol map pattern "p" is applied to bit segment "p," and another exemplary symbol map pattern "q" is applied to bit segment "q." In one embodiment, the symbol map patterns are individually unique from one another and each exclusively designated to correspond to only one of the bit segments. In some embodiments, the inter-packet selective symbol mapper 114 configures a Gray-coded symbol map pattern and applies a Gray-coded symbol map pattern only to the bit segment whose transmission iteration is a first-time transmission. In other words, the Gray-coded symbol map pattern is applied only to those bits that are being transmitted for the first time. Hence, in one embodiment, the first symbol map pattern is the only Gray-coded symbol map pattern, and the first symbol map pattern applies only to the bit segment whose bits are being transmitted for the first time.

In one embodiment, the inter-packet selective symbol mapper 114 selectively applies an optimized symbol map pattern to each bit segment whose transmission iteration is subsequent to the first-time transmission. Optimization may include rearranging a plurality of constellation points on a symbol map pattern. In one embodiment, rearranging includes separating any two constellation points on the symbol map pattern where the Euclidean distance between the any two constellation points measures a minimum Euclidean distance, such that the new Euclidean distance between the any two constellation points measures at least two times the minimum Euclidean distance. For example, an exemplary symbol map pattern "m" is derived by rearranging the constellation points on the exemplary symbol map pattern "m-1" such that symbol map pattern "m-1" is applied to bit segment "m-1" or iteration "m-1" and symbol map pattern "m" is applied to bit segment "m" of iteration "m."

In one embodiment, the modulator 116 implements an orthogonal frequency division multiple access modulation (OFDMA) scheme to modulate the bit-to-symbol mapped retransmission packet at the physical layer (PHY) and to drive the transmitter antenna 118 with the modulated retransmission packet. In one embodiment, the modulator 116 implements a scalable orthogonal frequency division multiple access modulation (SOFDMA) scheme. The transmitter antenna 118 then transmits the modulated retransmission packet signal to the receiver 104.

As depicted in FIG. 1, the receiver 104 includes at least one receiver antenna 120, at least one demodulator 122, an inter-packet selective symbol de-mapper 124, a decoder 126, a data sink 128, an input packet processor 130, and a receiver memory device 132. The receiver 104 sends a retransmission request to the transmitter 102 when the receiver 104 receives a transmission packet from the transmitter 102 over a noisy channel. When a transmission packet is sent across a noisy channel, portions of data in the transmission packet may be lost or corrupted, which may render at least some of the data contained in the transmission packet indecipherable by the receiver 104. There are numerous types of noise. One exemplary type of noise is fading. Fading refers to the distortion that a modulated signal experiences over certain propagation media. In wireless systems, fading is due to multipath propagation and is sometimes referred to as multipath induced fading. Other types of noise include frequency selectivity, interference, self interference, terrain blocking, nonlinearity, and dispersion. When the receiver 104 cannot decipher some or all of the data contained in the transmission packet, the receiver 104 may send a retransmission request to the transmitter 102, requesting that the transmitter 102 retransmit the transmission packet that was corrupted. As explained above, the retransmission request may be a hybrid automatic repeat request (HARQ) and the retransmission packet may be an incremental redundancy (IR) packet.

The receiver antenna 120 receives the modulated retransmission packet transmitted by the transmitter 102. The demodulator 122 senses the modulated retransmission packet received by the antenna 120 and de-modulates the modulated retransmission packet. In one embodiment, the demodulator 122 is an orthogonal demodulator configured to de-modulate an SOFDMA modulated signal.

Following the demodulation of the modulated retransmission packet, in one embodiment, the inter-packet selective symbol de-mapper 124 de-maps the symbol map patterns respectively applied to the bit segments contained in the de-modulated retransmission packet in a symbol-to-bit de-mapping process. For each bit-to-symbol symbol map pattern there is a complementary symbol-to-bit de-mapping scheme. Following the de-mapping of the symbol map patterns, the decoder 126 decodes each bit segment contained in the de-mapped retransmission packet based on the transmission iteration of each bit segment, and the data sink 128 then stores the decoded bits. In one embodiment, the decoder 126 implements an iterative turbo code decoder to decode the de-mapped retransmission packet. In another embodiment, the decoder implements a Viterbi algorithm to decode the de-mapped retransmission packet. Other embodiments may implement other types of decoders.

In the case that the de-mapping and decoding are successful, i.e. the de-mapped and decoded bits are decipherable and no errors are detected, then the bits are transferred to upper layers (L2/L3) for further processing. If the data is decoded unsuccessfully and errors are detected, the unsuccessfully decoded data is stored in the incremental redundancy (IR) database 134, and the receiver 104 sends a retransmission request. In one embodiment, the IR database 134 is stored in a receiver memory device 132. If the data that is decoded unsuccessfully is sent as a result of a retransmission request, then the receiver 104 will already have other data stored in the IR database 134 from a prior transmission. The input packet processor 130, in one embodiment, then combines the data presently received from a retransmission with correlated data from a previous transmission (data already stored in the IR database 134) in an attempt to deduce the correct decoding of the data from the combination of the two or more sets of redundant and correlated data. In this example, each set of data was transmitted by the transmitter 102 and then received by the receiver 104 sequentially at different times.

In some embodiments, the memory devices 108 and/or 132 are a random access memory (RAM) or another type of dynamic storage device. In other embodiments, the memory devices 108 and/or 132 are a read-only memory (ROM) or another type of static storage device. In other embodiments, the illustrated memory devices 108 and/or 132 are representative of both RAM and static storage memory within the inter-packet selective symbol mapping diversity system 100. In some embodiment, the memory devices 108 and/or 132 are content-addressable memory (CAM). In other embodiments, the memory devices 108 and/or 132 are an electronically programmable read-only memory (EPROM) or another type of storage device. Alternatively, a separate memory device may be coupled, as depicted, to the transmitter 102 and the receiver 104. Additionally, some embodiments store the instructions as firmware such as embedded foundation code, basic input/output system (BIOS) code, inter-packet symbol mapping code, and/or other similar code.

Figure 2:
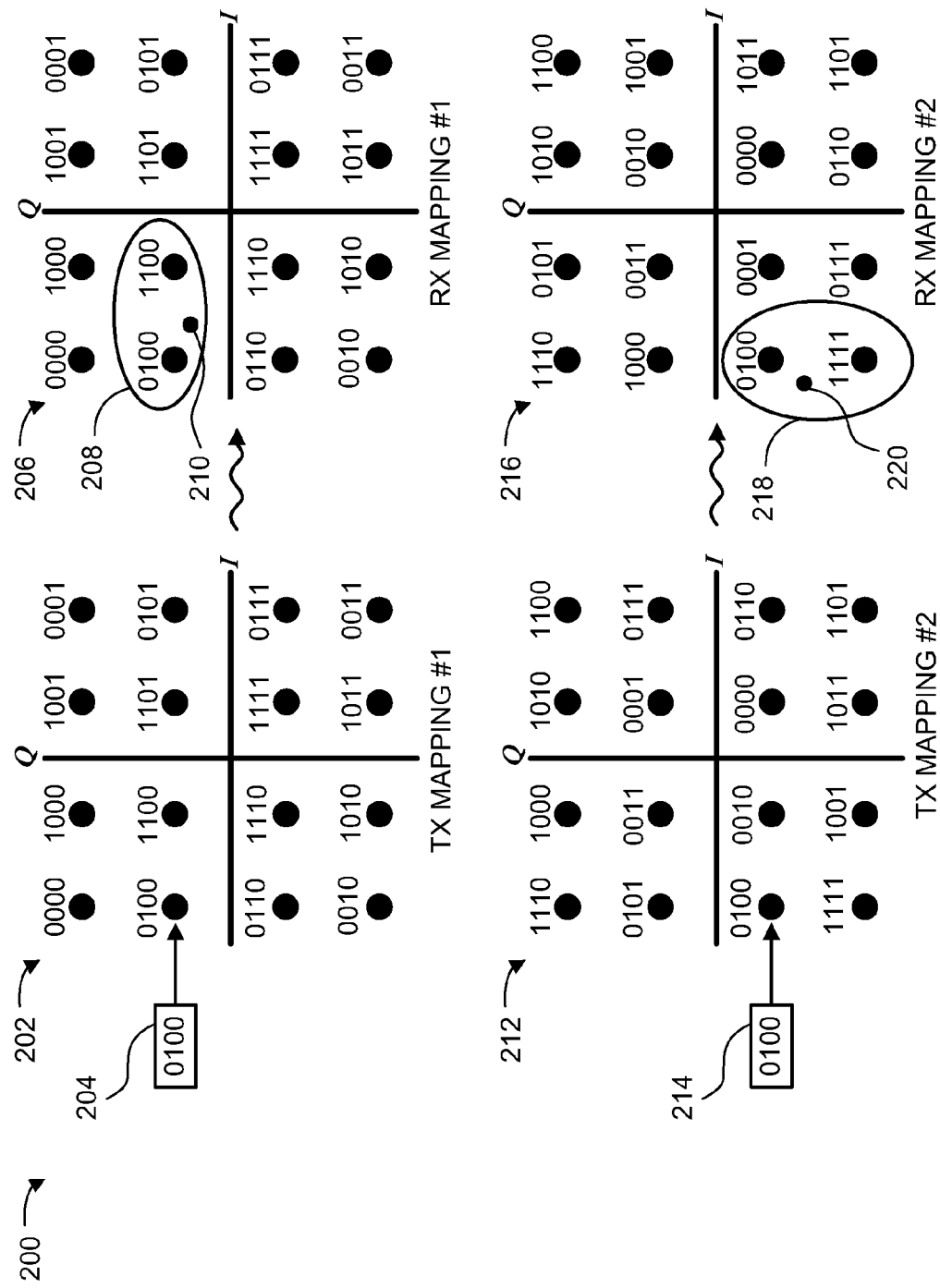
FIG. 2 depicts a schematic block diagram of one embodiment of a modulation scheme for use in the inter-packet selective symbol mapping diversity system of FIG. 1.

FIG. 2 depicts a schematic block diagram of one embodiment of a modulation scheme 200 for use in the inter-packet selective symbol mapping diversity system 100 of FIG. 1. As explained above, the modulator 116 implements an orthogonal frequency division multiple access modulation (OFDMA) scheme to modulate the bit-to-symbol mapped retransmission packet at the physical layer (PHY). In an OFDM system, a data stream with a high data rate is divided into multiple parallel low rate data streams. Each smaller data stream is then mapped to an individual data sub-carrier and modulated using a modulation scheme 200. By way of example, the illustrated modulation scheme 200 implements a quadrature amplitude modulation (QAM) modulation scheme, specifically QAM-16. Exemplary QAM-based modulation schemes include QAM-16, QAM-64, QAM-128, and QAM-256. Other types of modulation schemes include PSK (phase shift keying), phase modulation (PM), frequency-shift keying (FSK), and amplitude-shift keying (ASK). The modulation scheme 200 may implement any of these or other similar modulation schemes.

Transmit mapping #1 202 depicts a QAM-16 constellation diagram. In QAM constellation diagrams, the constellation points are typically arranged in a square grid with equal vertical and horizontal spacing, although other configurations are possible. A constellation diagram displays a data word in a two-dimensional diagram in the complex plane. In other words, it represents the possible symbols that may be selected by a given modulation scheme as points in the complex plane. The real axis is often called the in phase, or I-axis, and imaginary axis is often called the quadrature, or Q-axis.

The modulation scheme 200 depicts a data word 204 that contains the bits "0100" as an exemplary portion of data in a transmission packet. In the modulation scheme 200, the inter-packet selective symbol mapper 114 maps the data word 204 to the appropriate constellation point on transmit mapping #1 202 for all the bits in the transmission packet that are being transmitted for the first time. In one embodiment, the inter-packet selective symbol mapper 114 applies other transmit mappings to other bits in the transmission packet based on the transmission iteration of those bits. As depicted, the transmitter 102 then transmits the bit-to-symbol signal over a noisy channel that affects the bit-to-symbol signal in transmission. When the receiver 104 receives the bit-to-symbol signal, the received bit-to-symbol signal 210, as depicted, is shifted away from the target constellation point on the receiver mapping #1 206 due to the effects of the noise. In one embodiment, a receiver symbol mapping is complementary to a transmit symbol mapping according to an associated transmission iteration. The extent of the shift of the received bit-to-symbol signal 210 is such that the receiver 104 is unable to resolve the intended constellation point with any certainty. However, in some embodiments, the receiver 104 is able to narrow the intended constellation point to a select number of potential constellation points 208. In this example, the receiver 104 narrows the potential constellation points 208 to constellation points "0100" and "1100." The receiver 104 then sends a retransmission request and stores the received bit-to-symbol signal 210 in the IR database 134 for further review following the results of the retransmission request. The transmitter 102 receives the retransmission request and sends a retransmission packet. In one embodiment, the data in the retransmission packet is again mapped to points on a constellation map, except the inter-packet selective symbol mapper 114 applies a transmit mapping #2 212 to all the bits in the retransmission packet that are transmitted for a second time, where the transmit mapping is optimized by rearranging the constellation points, as explained above in regards to FIG. 1. In this case, the retransmitted data word 214 contains the same exemplary portion of data bits "0100" as data word 204. In one embodiment, the inter-packet selective symbol mapper 114 applies transmit mapping #1 202 to bits in the retransmission packet that are transmitted for the first time. In one embodiment, the inter-packet selective symbol mapper 114 applies other transmit mappings to bits in the retransmission packet based on the transmission iteration of those bits.

The transmitter 102 then retransmits the bit-to-symbol signal over a noisy channel that again affects the bit-to-symbol signal in transmission. When the receiver 104 receives the retransmitted bit-to-symbol signal, the subsequent received bit-to-symbol signal 220 is again shifted away from the target constellation point on the receiver mapping #2 216 due to the effects of the noise. The extent of the shift is such that the receiver 104 is again unable to resolve the intended constellation point with any certainty. However, the receiver 104 is again able to narrow the intended constellation point to a select number of subsequent potential constellation points 218. In this case, the receiver 104 narrows the subsequent potential constellation points 218 to constellation points "0100" and "1111." In one embodiment, the input packet processor 130 then combines the potential constellation points 208 with the subsequent potential constellation points 218 to determine the intended constellation point. In this example, the input packet processor 130 successfully determines that the intended constellation point is "0100" due to the fact that the potential constellation points have one constellation point in common, and that constellation point is "0100."

Figure 3:
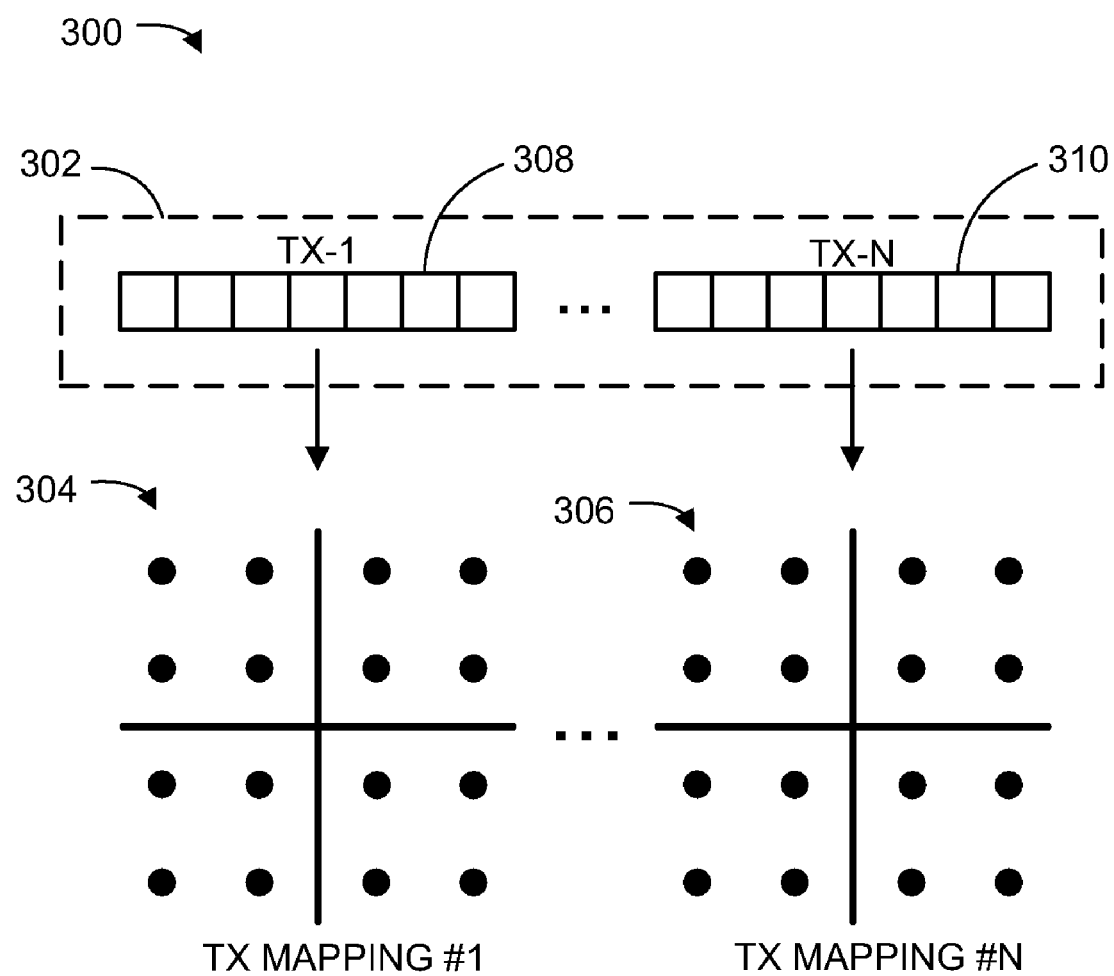
FIG. 3 depicts a schematic block diagram of one embodiment of a joint incremental redundancy and symbol mapping diversity scheme for use in the inter-packet selective symbol mapping diversity system of FIG. 1.

FIG. 3 depicts a schematic block diagram of one embodiment of a joint incremental redundancy and symbol mapping diversity scheme 300 for use in the inter-packet selective symbol mapping diversity system 100 of FIG. 1. The joint incremental redundancy and symbol mapping diversity scheme 300 includes an incremental redundancy packet 302, a transmit mapping #1 304, and a transmit mapping #2 306. The transmit mappings depicted in the joint incremental redundancy and symbol mapping diversity scheme 300 are substantially similar to those depicted in regard to FIG. 2. When a transmitter 102 receives a request to retransmit a packet due to errors on the receiver 104 side, the transmitter assembles an incremental redundancy packet 302. The incremental redundancy packet 302 includes bits of varying transmission iterations, and the transmitter 102 groups those bits into bit segments according to the transmission iteration of each bit. Those bits that are transmitted for the "first time" are grouped into a "first-time" bit segment 308 in the retransmission packet 302. Those bits that are transmitted for the "Nth-time" are grouped into an "Nth-time" bit segment 310. Every bit is grouped into respective bit segments from "1 to N" based on transmission iteration. The transmitter 102 then maps the "N" bit segments to "N" bit-to-symbol mapping patterns based on transmission iteration of each bit segment. As an example, the "first-time" bit segment 308 is mapped to transmit mapping #1 304 and the "Nth-time" bit segment 310 is mapped to transmit mapping #N 306.

Figure 4:
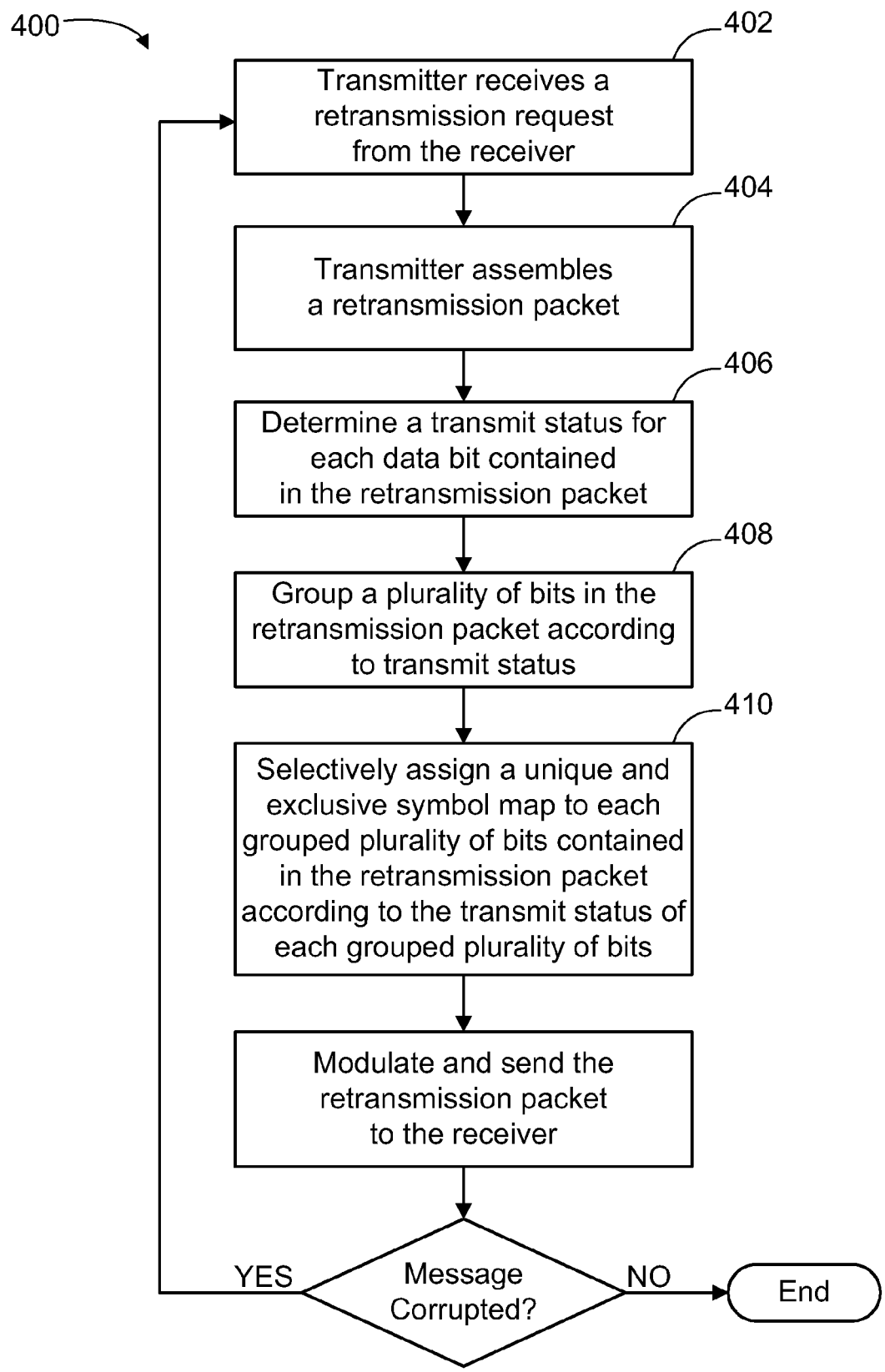
FIG. 4 depicts a systematic flowchart diagram of one embodiment of a joint incremental redundancy and symbol mapping diversity method for use in the inter-packet selective symbol mapping diversity system of FIG. 1.

FIG. 4 depicts a systematic flowchart diagram of one embodiment of a joint incremental redundancy and symbol mapping diversity method 400 for use in the inter-packet selective symbol mapping diversity system 100 of FIG. 1. Although the joint incremental redundancy and symbol mapping diversity method 400 is described in conjunction with the inter-packet selective symbol mapping diversity system 100 of FIG. 1, some embodiments of the method 400 may be implemented with other inter-packet selective symbol mapping diversity systems.

At block 402, the transmitter 102 receives a retransmission request from the receiver 104. The transmitter 102 then assembles a retransmission packet, at block 404, in response to the receipt of the retransmission request. Next, at block 406, the transmitter 102 determines a transmit iteration for each data bit contained in the retransmission packet. At block 408, the transmitter 102 then groups a plurality of bits in the retransmission packet according to the transmission iteration of the plurality of bits.

At block 410, the transmitter 102 selectively assigns a unique and exclusive symbol map to each grouped plurality of bits contained in the retransmission packet according to the transmission iteration of each grouped plurality of bits. The transmitter 102 then modulates and sends the retransmission packet, at block 412, to the receiver 104. The receiver 104 then determines at block 414 whether the data content of the retransmission packet is corrupted. In other words, the receiver 104 determines whether an additional retransmission packet will be requested to decipher the data content of the retransmission packet. If the receiver 104, at block 414, determines that the data content of the retransmission packet is decipherable then the joint incremental redundancy in symbol mapping diversity method 400 ends. Otherwise, the receiver 104 sends an additional retransmission request to the transmitter 102.

Embodiments of the system and method of the joint incremental redundancy and symbol mapping diversity process described can have a real and positive impact on improving performance of incremental redundancy based communication systems. For example, some embodiments provide a process of integrating the advantages of symbol mapping diversity with incremental redundancy. Additionally, some embodiments facilitate improving performance without any additional complexity required in the communication system. Moreover, embodiments of the system and method provide a measurable gain in data throughput and the signal to noise ratio.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to apply an inter-packet selective symbol mapping in a joint incremental redundancy (IR) and symbol mapping diversity system.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution system, apparatus, or device.

The computer-useable or computer-readable storage medium can be an electronic, magnetic, optical, electromagnetic, infrared, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), a digital video disk (DVD), and high-definition (HD) disks such as Blu-Ray and HD-DVD.

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-op-

What is claimed is:

1. A system comprising:
a transmitter to packetize a retransmission packet according to a modulation scheme in response to a retransmission request from a receiver, the transmitter comprising:
an output packet processor to determine a transmission iteration of a bit segment of the retransmission packet; and
an inter-packet selective symbol mapper coupled to the output packet processor, the inter-packet selective symbol mapper to apply a first symbol map pattern to the bit segment based on the transmission iteration of the bit segment and to apply a second symbol map pattern to another bit segment of the retransmission packet, wherein the first symbol map pattern is different from the second symbol map pattern.

2. The system of claim 1, wherein the retransmission request comprises a hybrid automatic repeat request (HARQ), and wherein the retransmission packet comprises an incremental redundancy (IR) packet.

3. The system of claim 1, wherein each of the first and second symbol map patterns are unique within a plurality of symbol map patterns, wherein the first symbol map pattern exclusively corresponds to the bit segment within the retransmission packet.

4. The system of claim 3, wherein the inter-packet selective symbol mapper is further configured to apply a Gray-coded symbol map pattern to the bit segment, wherein the bit segment comprises bits that are transmitted for the first time.

5. The system of claim 4, wherein the inter-packet selective symbol mapper is further configured to selectively apply an optimized symbol map pattern to the other bit segment, wherein the optimization comprises rearranging a plurality of constellation points of symbol map pattern of the first symbol map pattern, wherein the rearrangement comprises a separation of any two constellation points in the first symbol map pattern whose Euclidean distance measures a minimum Euclidean distance such that a new Euclidean distance between the any two constellation points in the optimized symbol map pattern measures at least two times the minimum Euclidean distance.

6. The system of claim 1, wherein the transmitter further comprises an encoder coupled to the inter-packet selective symbol mapper, the encoder to implement a convolutional encoding scheme, wherein the convolution encoding scheme is a turbo code.

7. The system of claim 1, further comprising a receiver, the receiver to de-packetize the retransmission packet, wherein the receiver comprises:
a demodulator to receive and demodulate the retransmission packet received by the receiver;
an inter-packet selective symbol de-mapper coupled to the demodulator, the inter-packet selective symbol de-mapper to de-map the first symbol map pattern respectively applied to the bit segment contained in the retransmission packet;
a decoder coupled to the inter-packet selective symbol de-mapper, the decoder to decode the bit segment contained in a de-mapped retransmission packet.

8. The system of claim 7, further comprising an input packet processor coupled to the decoder, the input packet processor to sort a plurality of bits in a decoded retransmission packet and to combine a decoded bit segment from the decoded retransmission packet with a stored bit segment from a previous transmission, wherein the decoded bit segment is associated with the stored bit segment, and wherein the stored bit segment is stored in an incremental redundancy database.

9. A method comprising:
packetizing a retransmission packet according to a modulation scheme in response to a retransmission request from a receiver;
determining a transmission iteration of a bit segment of the retransmission packet;
applying a first symbol map pattern to the bit segment based on the transmission iteration of the bit segment; and
applying a second symbol map pattern to another bit segment of the retransmission packet.

10. The method of claim 9, further comprising corresponding the first symbol map pattern exclusively to the bit segment within the retransmission packet, wherein each of the first and second symbol map patterns are unique within a plurality of symbol map patterns.

11. The method of claim 10, further comprising configuring and applying a Gray-coded symbol map pattern to the bit segment, wherein the bit segment comprises bits that are transmitted for the first time.

12. The method of claim 11, further comprising selectively applying an optimized symbol map pattern to the other bit segment, wherein the optimization comprises rearranging a plurality of constellation points of symbol map pattern of the first symbol map pattern, wherein the rearrangement comprises a separation of any two constellation points in the first symbol map pattern whose Euclidean distance measures a minimum Euclidean distance such that a new Euclidean distance between the any two constellation points in the optimized symbol map pattern measures at least two times the minimum Euclidean distance.

13. The method of claim 9, further comprising implementing a convolutional encoding scheme, wherein the convolution encoding scheme is a turbo code.

14. The method of claim 9, further comprising de-packetizing the retransmission packet, wherein the de-packetizing comprises:
receiving and demodulating a modulated retransmission packet received by the receiver;
de-mapping the first symbol map pattern respectively applied to the bit segment contained in the retransmission packet; and
decoding the bit segment contained in a de-mapped retransmission packet.

15. The method of claim 14, further comprising sorting a plurality of bits in a decoded retransmission packet and combining a decoded bit segment from the decoded retransmission packet with a stored bit segment from a previous transmission, wherein the decoded bit segment is associated with the stored bit segment, and wherein the stored bit segment is stored in an incremental redundancy database.

* * * * *